United States Patent [19]

Berger, Jr. et al.

[11] 4,256,474
[45] Mar. 17, 1981

[54] FILTER HOUSING AND FILTER ASSEMBLIES UTILIZING THE SAME

[75] Inventors: L. Joseph Berger, Jr.; Denis D. Guequierre, both of Birmingham, Mich.

[73] Assignee: Finite Filter Company, Inc., Oxford, Mich.

[21] Appl. No.: 962,000

[22] Filed: Nov. 20, 1978

[51] Int. Cl.³ .................. B01D 46/42; B01D 50/00; B65D 6/02
[52] U.S. Cl. .................. 55/482; 55/316; 55/318; 55/502; 55/503; 55/310; 55/DIG. 25; 55/385 C; 220/4 B; 220/301
[58] Field of Search .............. 55/316, 318, 387, 482, 55/483, 489, 492, 500, 502, 503, 509, 510, 511, DIG. 25, 309, 310, 385 C, 527, 528; 210/232, 314, 316, 322, 448, 450; 220/4 B, 295, 298, 300, 301, 302

[56] References Cited

U.S. PATENT DOCUMENTS

| 2,357,943 | 9/1944 | Feagley et al. | 55/502 |
|---|---|---|---|
| 2,781,913 | 2/1957 | Thompson | 55/492 |
| 3,130,025 | 4/1964 | Bowden et al. | 55/510 |
| 3,218,785 | 11/1965 | Tietz | 55/510 |
| 3,246,920 | 4/1966 | Pall | 210/322 |
| 3,353,339 | 11/1967 | Walter | 55/510 |
| 3,364,658 | 1/1968 | Walker | 55/309 |
| 3,540,190 | 11/1970 | Brink, Jr. | 55/527 |
| 3,633,757 | 1/1972 | Madern | 55/498 |
| 3,772,857 | 11/1973 | Jackson et al. | 55/418 |
| 3,800,510 | 4/1974 | Lamond | 55/502 |
| 3,856,683 | 12/1974 | Parr | 210/489 |
| 3,890,123 | 6/1975 | Kuga | 55/318 |
| 4,027,777 | 6/1977 | Blanke, Jr. | 220/295 |
| 4,052,316 | 10/1977 | Berger, Jr. et al. | 210/315 |
| 4,130,405 | 12/1978 | Akado et al. | 55/503 |
| 4,148,732 | 4/1979 | Burrow et al. | 55/503 |

FOREIGN PATENT DOCUMENTS

| 1136897 | 9/1962 | Fed. Rep. of Germany | 55/316 |
|---|---|---|---|
| 2547404 | 4/1977 | Fed. Rep. of Germany | 220/301 |
| 1526501 | 9/1978 | United Kingdom | 210/450 |

Primary Examiner—David L. Lacey
Attorney, Agent, or Firm—Dolgorukov & Dolgorukov

[57] ABSTRACT

The specification discloses a two-piece twist apart filter housing adapted to be interposed in a conduit supplying or receiving air or other medium from a device, wherein the two parts of the housing can be twisted apart to permit replacement of the various types of filter media without detaching either end of the filter housing from said conduit. There are also disclosed particular filter assemblies utilizing said filter housing wherein there is provided a particulate filter, a coalescing filter, and an odor filter assembly which can easily be removed and replaced when needed without removing the filter housing from the supply line.

9 Claims, 10 Drawing Figures

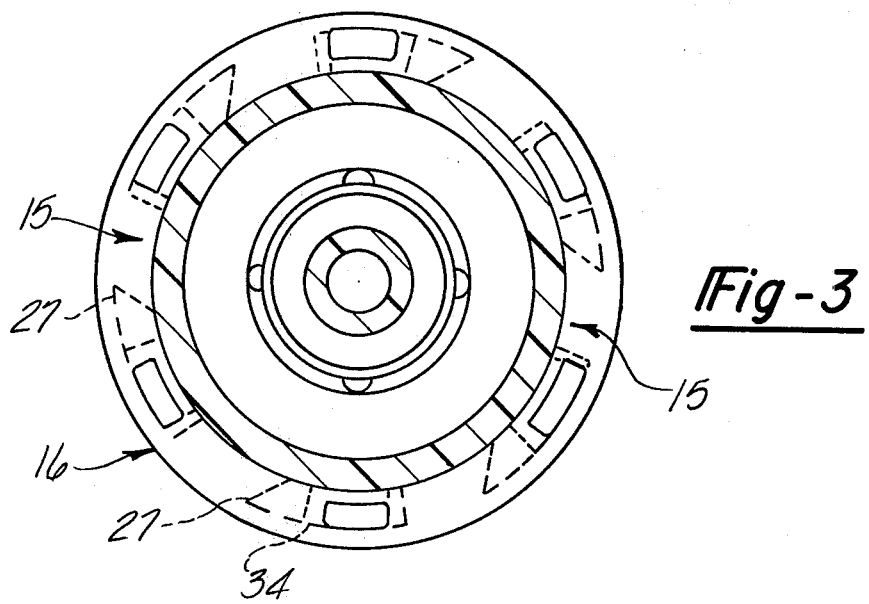
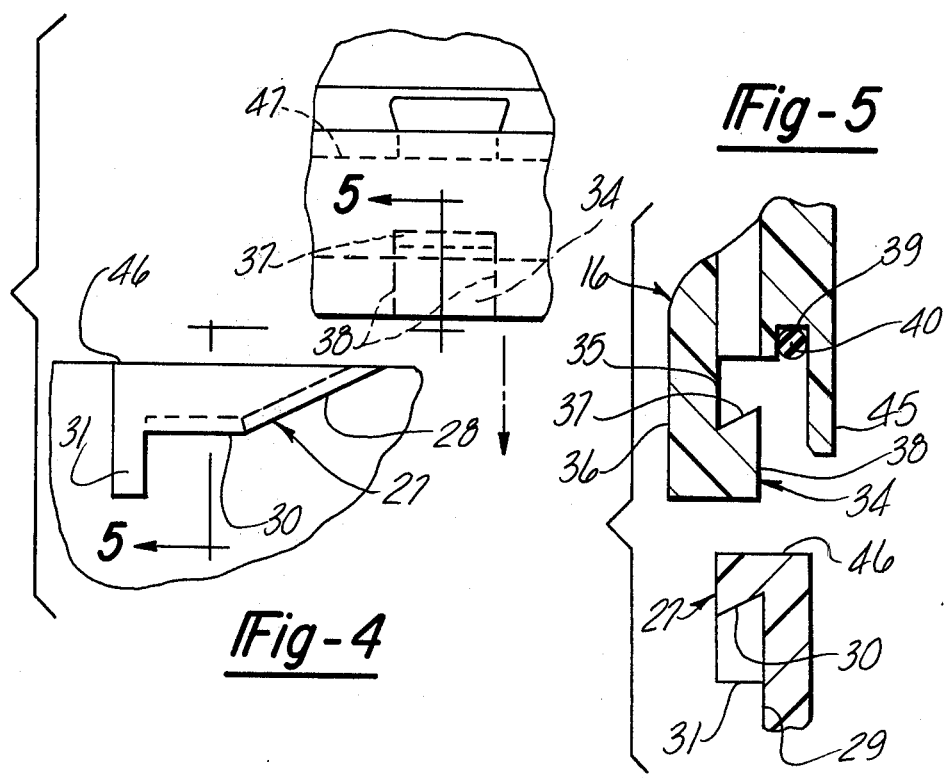

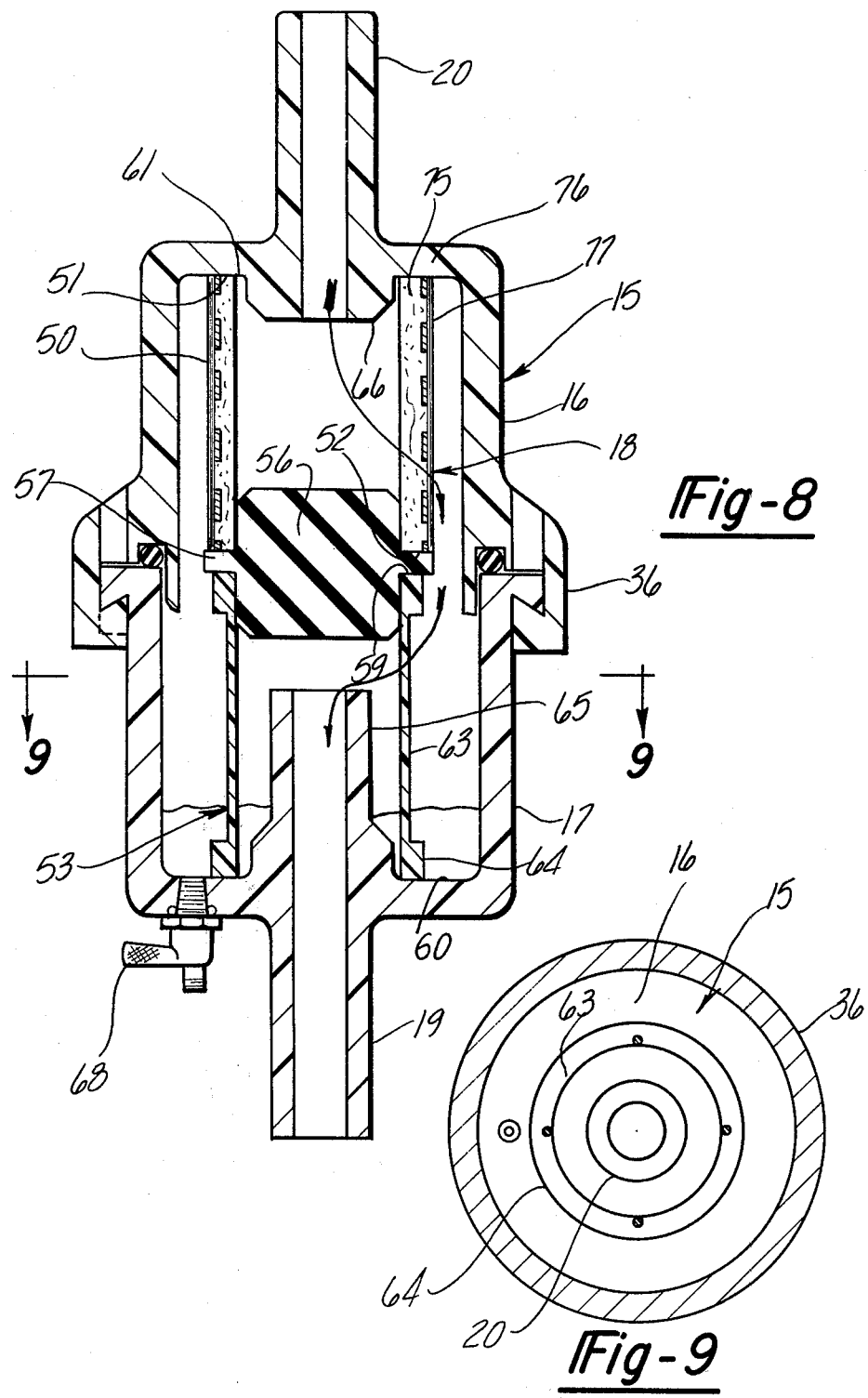

FILTER HOUSING AND FILTER ASSEMBLIES UTILIZING THE SAME

The present invention relates to filter housings, and more particularly to in-line filter housings having removable filter cartridges therein, and acting as ador, coalescing, particulate, or other types of filters.

STATEMENT OF PATENTABILITY

A prior art search concerning in-line filter housings revealed the following patents of interest: 3,443,367, E.W. Bottum; 3,876,400, V.L. Franz; 3,527,027, R.E. Knight, et al.; 2,068,048, R.P. Adams; 3,890,123, A. Kuga; 3,681,899, G.A. Grote; 3,772,857, R.H. Jackson, et al.

None of the above patents are believed to be material to the examination of the present application as the devices described therein all suffer from one or more of the material deficiencies to be discussed immediately below.

There has long been the need in modern industrialized society for various means to filter contaminants from the environment whether that environment be air or some other gaseous type. There may be the need, for example, to filter solid particles from the smoke produced by industrial processes, or the need to coalesce oil from a compressed air supply before running air-operated machinery, or more recently, the need to remove odors from a particular environment.

As an example, when these problems first presented themselves in the compressed air field, a typical filter used for coalescing water and oil from the air supply consisted of a filter of circular cross section sealingly bonded to two end caps, one of which was threaded to allow it to be placed in, and securely fastened to, a filter housing having an inlet into the interior of the filter assembly so formed. A glass or metal bowl then was attached to the housing in a manner to encircle the filter, and an outlet was provided in the housing communicating with the space between the glass bowl and the filter assembly. These type filter housings were placed at the point of use and provided satisfactory service as long as relatively low temperature, low pressure applications were encountered.

When problems other than compressed air filtration presented themselves, the basic arrangement was the same, and as before, when relatively low pressures were used, a satisfactory filtering action was found whether one was using an activated charcoal filter to filter odors out of the air, a fiberglass filter media to filter particles from the environment, or a prefilter-coalescing filter arrangement to coalesce oil and water out of a compressed air supply.

However, as technology advanced, problems were encountered in maintaining an effective point of use filter. As machines were developed to accomplish production processes in a faster manner, such machines required finer and finer air filtration, and it was found that the filters had to be of increased size, and the housings were becoming too bulky in many cases, and too expensive to be applicable at point of use locations adjacent the air receiving device. In many cases the filter had to be mounted some distance from the operating device, resulting in a decrease of efficiency and increased costs.

As air filtration requirements became more and more critical there were some advances in the filtration field which helped to keep the problem of point of use filters from becoming completely unmanageable, and such evolution of events is described in our U.S. Pat. No. 4,078,965. In such patent there is discussed the fact that as temperatures increased in compressors, and synthetic oils came into widespread use, it was found that the old fiber felt media began to deteriorate. Such problems were more severe if a foam rubber drain layer was used in a coalescing type filter, as such drain layers were also disintegrated by synthetic oils. These problems resulted in a change from the old organic type filter to a fiberglass material potted between end caps, and this resulted in a more efficient filter which could be of smaller size than the filter is replaced, but still did not solve the problem of providing a small, highly efficient point of use coalescing filter. While further advances in filtering technology led to the elimination of potted on end caps, and then to the end sealing of a filter tube in a housing between end caps, thus reducing the cost of the filter assembly, this had little further effect on the reduction of the bulkiness of the point of use filters previously available. Thus, a great need was felt in the art to reduce the size of the filter assemblies used to coalesce water and oil from compressed air supplies.

Many attempts were made to solve this problem, and one of which we are familiar was to rearrange the components in an axial relationship. A pair of end caps of suitable configuration having an opening therein were adapted to be secured to each other in a spaced relationship, that relationship being governed by a transparent external wall of circular cross section which was adapted to be compressed against rubber gaskets in either of the end housings to form an enclosed space. At the same time, interiorly of the external wall, a filter element of circular cross section was adapted to be compressed against one end of the housing by a flange mounted on the means which threadably secured the end caps together. Fluid entering one of the ends of the housing would pass in the space between the filter and the exterior wall, pass through the filter wall and exit through the opening in the other end of the housing. An example of this type of filter can be seen in a model D4 filter manufactured by Alondra, Inc. of Inglewood, Calif., and disclosed in U.S. Pat. No. 3,317,843.

While a compact filter was produced which appeared to provide a small efficient point of use filter for use in critical applications where the filter had to be immediately adjacent the device using the compressed air, this type of filter still had serious problems which prevented it from being a satisfactory point of use filter. The first of these, and in fact all of them, can be attributed to the fact that the filter screws apart. Also, the hose or other conduit must be removed from at least one end of the filter when it is time to replace the filter media. This is undesirable because it is very inconvenient, and one must wiggle the hose and clamp loose. This is functionally very bad because one may eventually loosen up the seal between the conduit and the clamp. Further, when this back and forth motion occurs one might recontaminate a filter with particles, or if a condensing filter is used, one may contaminate the filter with water.

Furthermore, it can be seen that the two halves of the filter screw together, and at least one end cap will rotate against one end of the filter media placed in the filter. For certain types of filtration, glass fiber filters are desirable, one such twisting motion against one of the end caps cannot be tolerated as this will destroy the end sealing of the filter tube by the chafing of the tube end against the end caps. This chafing will ruin the end region of the filter so that the filter will not seal properly and any imperfection on the end cap will gall the filter end regardless of the filter media used. The result of the galling and chafing of the end of the filter is particularly undesirable with the new fiberglass filter media which is used when high temperatures and/or pressures are used because the galling will ruin the slight deformation which occurs at the ends of the filter tube upon compression, which seal the same, and also any imperfections on the members causing such compression will gall the filter end. Thus, a small, efficient and durable point of use filter was still not available.

Thus, further attempts in the art were needed to solve this problem, and the second attempt of which we are aware involves the clamping together of two portions of a filter housing to form a housing which compresses a filter tube and has an in-line configuration. The two halves of the filter may be held together by a band clamp or a threaded ring which screws the two halves together while they are stationary. However, in doing this it was found that at least one piece had to be added to the filter assembly which introduced a very undesirable cost factor into the assembly, and also it was very clumsy to insert the filter cartridge into the housing and assemble it, taking in some cases two people to complete the assembly operation. Also, the two halves of the filter housing were not inherently aligned and thus it was hard to prevent leakage.

A further attempt involved making the two halves of the filter housing out of some material which could be welded together by ultrasonic or other means or adhesively secured together. While it was thought that this method of providing a filter housing could result in a cost low enough to, in effect, have a throwaway filter assembly wherein the filter housing and filter cartridge could be simply thrown away when used, this is not the result that occurred because all attempts at this type of solution to the problem resulted in a very high replacement cost.

Thus, none of the previous attempts to solve the problem of providing a high efficiency, particulate, absorbing or coalescing filter at the point of use at an economical cost were successful.

Therefore, one of the objects of the present invention is to provide a filter housing with a filter means contained therein adapted to be mounted in an air supply or other supply line at the point of use which allows the halves of the filter housing to be separated without removing the supply line from either end thereof.

A further object of the present invention is to provide a two-piece filter housing adaptable to receive a filter assembly therein wherein said filter assembly is easily replaceable by one operator.

Another object of the present invention is to provide a two-piece filter housing of the foregoing nature wherein the two halves of the housing are sealingly secured to each other without the use of threaded rings, band clamps or the like.

A further object of the present invention is to provide a two-piece filter housing adaptable to hold a filter assembly therein, wherein the two halves of the filter housing inherently align themselves when assembled.

Another object of the present invention is to provide a two-piece filter housing adaptable to receive a filter assembly wherein said halves of the filter housing are removably secured to each other without the use of any ultrasonic or adhesive fastening techniques.

A still further object of the present invention is to provide a point of use filter containing a filter assembly which may be removed from the filter housing by separating the two halves thereof without the need to remove the supply from either end of the filter housing.

A still further object of the present invention is to provide a filter assembly containing a filter tube wherein the separating of the filter housing to allow replacement of the tube involves a minimal amount of rotational motion to avoid chafing the filter cartridge.

A further object of the present invention is to provide a filter assembly of the foregoing nature adapted to coalesce water from air and oil.

Still another of the present invention is to provide a filter, including a filter housing and a particulate filter assembly sealingly mounted therein which can be removed and replaced with minimum amount of rotational movement to avoid galling the end or ends of the filter tube.

A still further object of the present invention is to provide a universal type two-piece twist apart filter housing which is adaptable to receive a filter assembly of the odor removing, particulate, condensing, or any practicable type which can be removed from the filter housing simply by twisting the two pieces of the housing apart.

A still further object of the present invention is to provide a coalescing filter assembly utilizing our unique filter housing which is relatively simple and inexpensive to manufacture.

A still further object of the present invention is to provide a filter assembly of the foregoing nature which contains a filter tube of such a nature that said filter assembly can function as an in-line coalescing filter assembly.

A still further object of the present invention is to provide a filter assembly of the foregoing nature which is adapted by virtue of a specialized filter tube to serve as an odor removing filter.

Another object of the present invention is to provide a filter assembly of the foregoing nature, capable of application to many filtering fields, which is relatively simple in nature and inexpensive to manufacture.

A still further object of the present invention is to provide a small point of use coalescing filter assembly having pre-filtration and final stage filtration (particulate or coalescing) and a moisture trap within a small point of use filter housing.

A still further object of the present invention is to provide a small point of use coalescing filter assembly having a coalescing stage with an oil sump within said filter assembly.

Further objects and advantages of this invention will be apparent from the following description and appended claims, reference being had to the accompanying drawings forming a part of the application, wherein like reference characters designate corresponding parts in the several views.

FIG. 3 is a sectional view taken in the direction of the arrows along the section line 3—3 of FIG. 2.

FIG. 4 is a fragmentary view of one of the securing means shown in dotted lines in FIG. 2 on a much enlarged scale.

FIG. 5 is a sectional view taken in the direction of the arrows along the section line 5—5 of FIG. 4.

FIG. 8 is a view similar in nature to FIG. 2 but showing an embodiment of the present invention adapted for use as an in-line coalescing filter.

FIG. 9 is a sectional view taken in the direction of the arrows along the section line 9—9 of FIG. 8.

It is to be understood that the invention is not limited in its application to the details of construction and arrangement of parts illustrated in the accompanying drawings, since the invention is capable of other embodiments, and of being practiced or carried out in various ways within the scope of the claims. Also it is to be understood that the phraseology and terminology employed herein is for the purpose of description and not of limitation.

After much experimentation in attempting to overcome the numerous problems in the prior art previously discussed, we arrived at a novel, simple and very inexpensive solution to providing an in-line filter housing wherein the filter assembly could be removed from the housing by separating the two housings at approximately the middle thereof, without removing either half of the housing from the line in which the filter was installed.

Figure 1:
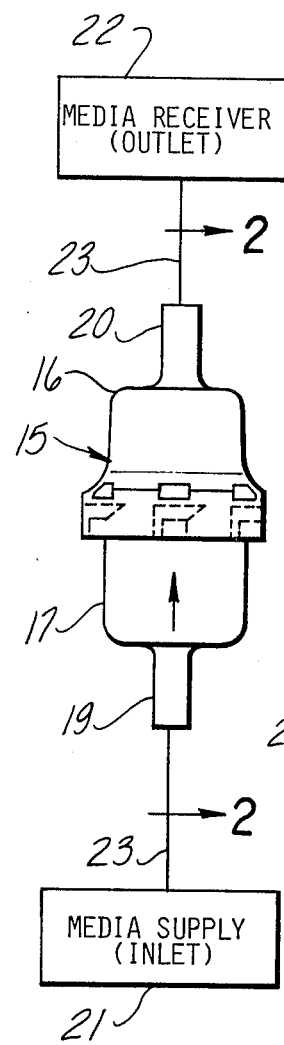
FIG. 1 is a generalized diagrammatic view showing a filter housing embodying the present invention mounted in a supply line between an inlet of a media to be filtered and an outlet of a media to be filtered. The inlet corresponding to a source of media, and the outlet corresponding to a machine which may use the media.

Referring specifically to FIG. 1, there is shown diagrammatically the filter of the present invention generally designated by the numeral 15. It consists of two halves, one of these being the generally bell-shaped female portion 16, and the other being the generally cup-shaped male portion 17. These two halves, when assembled in a manner to be described below, form a generally cylindrical hollow chamber, into which a filter assembly, generally designated by the numeral 18, may be placed. To provide an inlet into the filter housing, a hollow extension 19 of substantially circular cross section is provided.

To provide an outlet, a hollow axially extending extension 20 is provided on the bell-shaped female portion of the housing 16. The inlet 19 and the outlet 20 are shown in general diagrammatical terms in FIG. 1 to be connected to a media supply 21 and a media receiver 22 by the conduit 23.

It should be understood that the media and the media receiver, depending upon the particular type of filtration operation being performed, can be of practically any type, and thus the general designation of these by the numerals 21 and 22. Also the conduit 23 can be of any practicable construction, and may be attached to the inlet and outlet, 19 and 20 respectively, by practically any type of connection. For this reason, and since the type of connection is not critical to the invention, no particular construction is shown, since the manner of connecting conduits to filter housings is well known in the art.

To accomplish the object previously set forth of sealingly engaging the two portions of the filter housing with a minimum of twisting motion, which would gall the ends of the filter assemblies to be described hereinafter, the cup-shaped male portion 17 of the filter housing is provided which a plurality of radially and axially extending projections generally designated by the numeral 27. Such radially and axially extending projections include a plurality of axially extending sidewalls and a ramp portion 28 forming a negative rake with the outer sidewall 29 of the male portion of the housing 17. The ramp portion 28 communicate with a platform portion 30 which, in turn, terminates with a stop portion 31. The projections 27 are adapted to mate with an equal number of radially and axially extending receptors generally designated by the numeral 34 provided on the inner rim sidewall 35 of the rim 36 provided on the bell-shaped female portion 16 of the housing 15. A platform 37, complimentary in shape to the platform 30 of the projection 27, is provided. A plurality of axially extending sidewalls 38 completes the receptor 34.

An annular recess 39 is provided in the female-shaped portion 16 into which an O-ring 40 is inserted. To aid in the alignment of the male and female portions of the housing and the engagement thereof, an annular extension 45 is also provided interiorly of the rim 36 of the female portion of the housing 16. In operation, to sealingly connect the two portions of the housing, the projections 27 on the male portion of the housing 17 would be inserted into the spaces between the receptors 34 provided on the female portion of the housing 16 until the end wall of the male portion 46 almost contacts the end wall 47 of the female portion 16. It can be seen that contact will never quite be made because the end wall 46 will contact the O-ring 40, thus, effecting the sealing between the two portions of the housing. The O-ring 40 will be compressed to some extent by virtue of the ramp portion 28 of the projections 27 engaging the complimentary platform portion 37 of the receptor with the application of sufficient force depending upon the application to which the filter is being put, and the engaging force necessary to perform that function. The ramp portion 27 will ride up the platform 37 and compress the gasket 40 until the platform portion 30 engages the complimentary platform portion 37 of the receptor, at which time continual twisting of the two portions of the housing will cause the platform portion 30 of the projection to slide along the complimentary platform portion 37 of the receptor 34 until the stop portion 31 of the projection contacts the end wall 38 of the receptor 34. At this time, by choosing the proper dimensions for the housing portions and filter assembly components, which are well within the skill of the art to obtain based on the disclosure in the present application, the two portions of the filter housing will be sealingly engaged by virtue of the compression of the O-ring 40 providing a hollow chamber into which a filter assembly may be placed. It should be noted that the annular extension 45 aids alignment of the housing portions by virtue of its position immediately adjacent the inner sidewall of the male portion 17 of the housing. When the two portions are being assembled, the extension 45 tends to guide the two portions 16 and 17 together. Also, in operation is provides additional resistance to separation.

To aid in the escape of any air that may be trapped between the end walls 46 and 47, openings 90 are provided in the rim 36 of the bell-shaped female portion 16. These openings extend in an axial direction from the end wall 47 and terminate in the outer sidewall thereof. It should be understood that the number of pairs of projections and receptors will be a function of the operating condition which any particular filter housing will experience in operation. It can be seen that at a minimum at least one pair is required, while an upper limit would be any practicable number, depending upon the space available and the size of the filter housing. When the number of projections and receptors tend toward the lower limit, the annular extension 45 becomes particularly important not only for providing support for the O-ring 40, but in aiding in alignment of the male and female portions of the filter housing as previously described.

Having now described the particular manner of connecting the two halves of the filter housing, it will become apparent that our construction provides a particularly strong type of connection, while at the same time being one rather economical to manufacture. It can be seen that upon incurring large pressure differentials a vacuum condition may tend to exist inside the filter housing tending to pull the sidewalls of the filter inwardly toward themselves. If the platform portion 30 of the male portion 17, and the complimentary platform portion 37 of the receptor 34 had no rake, there would be a sliding motion which would easily occur providing an easy rupture of the seal provided by the compression of the O-ring 40 between the two halves of the housing.

It is obvious that a positive rake would even accentuate the problem, and provide a more rapid disengagement of the halves of the filter housing. Our novel provision of a negative rake (i.e., the ramps are inclined toward the sidewall) on the mating portions of the projections and receptors tends to prevent such rupture by forcing those portions to ride upwardly on themselves before any separation of the portions of the filter housing can take place which would allow a rupture to occur.

Now having described our unique filter housing, we shall now describe several embodiments of a novel filter assembly which may be placed and sealed therein, and thereby perform many operations depending upon the particular application and the particular configuration of the filter assembly which is used.

Our filter assembly, generally designated by the numeral 18, generally consists of an upper portion 50 having an upper end wall 51, a lower end wall 52, and being of generally annular cross section. It may take the form of a filter tube if desired. A second, lower portion of the assembly 53 is usually of similar cross section and has an upper end wall 54 and a lower end wall 55. It can be seen by virtue of both portions of the assembly having an annular cross section, a generally circular opening is defined by the upper and lower end walls of each portion. The lower end wall 58 is adapted to fit over a complimentary shaped upper projection 56a of a plug 56 and contact the upper wall 52 of a laterally extending rim 57 provided thereon.

Similarly, the upper end wall 54 of the lower portion of the assembly 53 is adapted to fit over a complimentary lower projection 56b of plug 56 and contact the lower wall 59 of the rim 57. Thus, the lower end of the upper portion and the upper end portion of the lower portion of the filter assembly are effectively sealed off from each other by the plug 56. The filter assembly formed thus far is then placed in the interior of the male portion 17 of the housing wherein the lower end wall 55 of the lower portion of the assembly contacts the interior end wall 60 of the male portion 17, while the upper end wall 51 of the upper portion of the assembly 18 contacts the interior end wall 61 of the female portion 16. The female portion 16 is then, in a manner previously described, placed into operational engagement with the male housing portion 17 to define a hollow chamber which now contains the filter assembly 18. By virtue of the compression of the O-ring 40 and the careful choosing of the dimensions of the plug 56, upper portion 50, and lower portion 53 of the filter assembly 18, the plug 56 is compressed to sealingly engage the end walls of the two portions of the assembly, and sealing is also effected between the upper end wall of the upper portion 51 and interior end wall 61 of the female portion 16, as well as the interior end wall of the male portion 60 and the end wall 55 of the lower portion of the filter assembly. Thus, a second sealed portion is set off from the rest of the hollow chamber formed by the two halves of the filter assembly, which may now be used to advantage for the purpose of filtration.

It should be understood that the lower portion 53 of the filter assembly may or may not be constructed of a filter material. This very provision of substituting many different elements for the lower portion 53 adds to the novelty and versatility of our invention.

Figure 2:
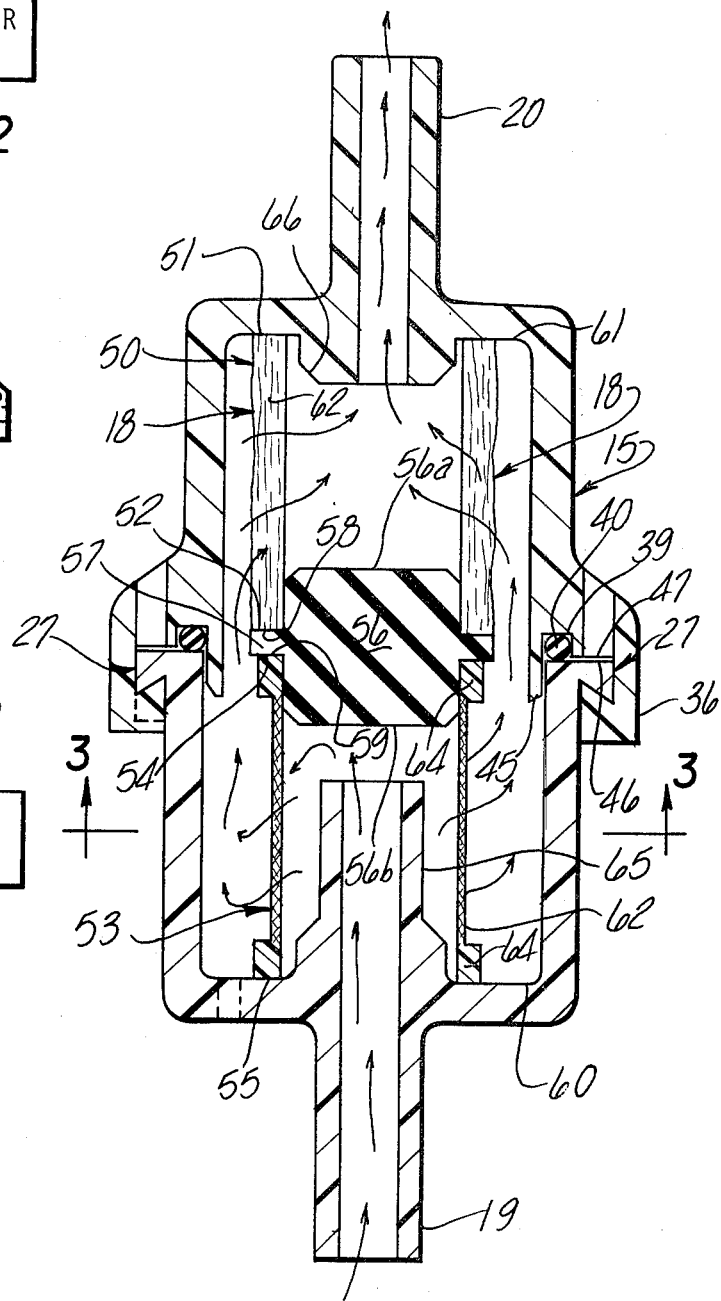
FIG. 2 is a sectional view taken in the direction of the arrows along the section line 2—2 of FIG. 1.
Figure 6:
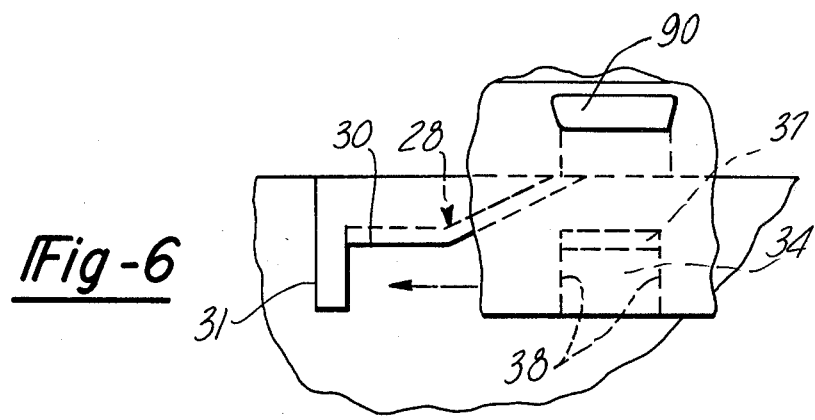
FIG. 6 is a view substantially similar to that of FIG. 4 but showing one of the plurality of fastening means about to become engaged.
Figure 7:
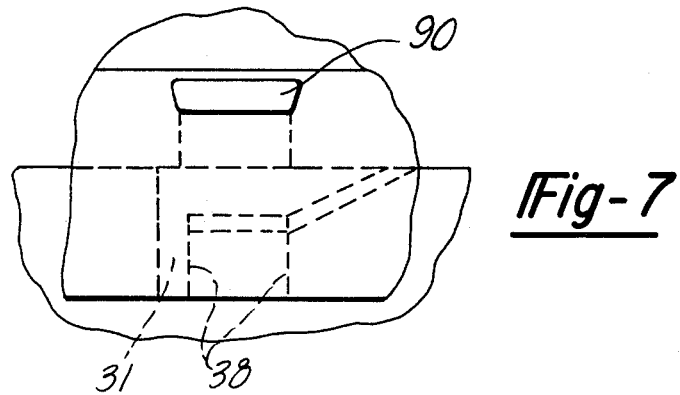
FIG. 7 is a view substantially similar to that of FIG. 6 showing one of the plurality of fastening means in its engaged position.

Referring now particularly to FIG. 2, there is shown a particulate filter wherein the upper portion 50 of the assembly 18 consists of a vacuum formed fiberglass tube 62 and the lower portion 53 of the assembly consists of a prefilter material 63 supported between two annular portions 64. In this construction a standpoint 65 is provided in axial alignment with the inlet 19 of the male portion. Supports between the annular portions 64 may be provided to support the prefilter 63 if desired.

It can now be seen that air entering the inlet 19 and proceeding through the standpipe 65 will encounter the projection 56b of the plug 56 and be directed laterally of the standpipe 65 through the prefilter 63 into the outer portion of the hollow chamber provided by the two filter portions. The air flow will then proceed in an axial direction where, because of the presence of the end wall 61, it will be forced in an inward direction through the filter tube 62 and then through the outlet 20 of the housing 15. To aid in alignment of the filter 62, a protuberance 66 is provided immediately below the outlet 20 and is of complimentary cross section to that of the filter tube 62.

It should be understood that in contrast to the female and male portions of the filter housing, which are generally of circular cross section to make operable the means connecting the two portions together, the hollow chamber provided interiorly of the assembly may be of any practicable desired cross section, as may be the upper and lower portions of the assembly 18. You may, for example, want for certain applications a triangularly-shaped assembly, or a rectangularly-shaped assembly, and merely by changing the cross section of the first and second portions of the assembly 18, the plug 56 and the protuberance 66, as well as possibly a portion of the standpipe 65, you may provide many different cross sections of the filter assembly 18. Also, while in this embodiment the inlet is indicated by the numeral 19, and the outlet by the numeral 20, as will be described below, the flow may be reversed and the portion of the housing 15 indicated by the numeral 20 may become the inlet and the portion indicated by the numeral 19 may become the outlet. The versatility of our filter assembly makes it applicable to a wide range of applications which is part of the novelty of the present invention. While the filter assembly previously described was one which may be used for particulate filtration, our housing is also adapted to contain a filter assembly which may be used for coalescing filtration. In this instance, reference to FIG. 8, the portions of the assembly described before remains substantially identical, with the exception of an upper portion 50 of the assembly, and the provision of a drainage means 68, which will be hereinafter described.

In this instance, the upper portion 50 of the assembly 18 may take the form of any one of the coalescing filter tubes described in the U.S. Pat. No. 4,052,316, dated Oct. 4, 1977, issued to myself and my co-inventor Denis D. Guequierre, and assigned to the Finite Filter Company, Inc. of Madison Heights, Mich. In the embodiment shown in FIG. 10, the configuration which is used would have to be the out-to-in filter configuration, rather than the in-to-out configuration, since the air flow, after passing through the lower portion 53, would be flowing into the first portion 50 in a radially inwardly direction. However, it should be understood that if appropriate changes were made, the in-to-out configuration could also be used.

In this case, there is illustrated a filter tube configuration consisting of a coalescing layer 75 in intimate interlocking contact with a perforated retainer tube 76 and having a wrapped or formed drain layer 77. With the air flow as before, droplets of water and oil will condense and collect in the bottom of the male portion of the housing 17. In order to evacuate the water at periodic intervals and prevent the saturation of the filter, a drain means 68, which may be any practicable type of means such as a valve, a ball cock or the like, is shown operably mounted to the male portion 17 of the housing 15. When the water approaches the top of the standpipe 65, either manual or automatic means may be provided to open the drain means 68 for a desired length of time to drain the water, and then the valve means may be re-closed and the filter placed back in operation.

Since a relatively brief time is required to drain water or oil from the filter housing, this drainage may occur periodicly, with the filter assembly remaining in operation. In fact, the pressure inside the housing will help to blow the water outside of the housing.

Figure 10:
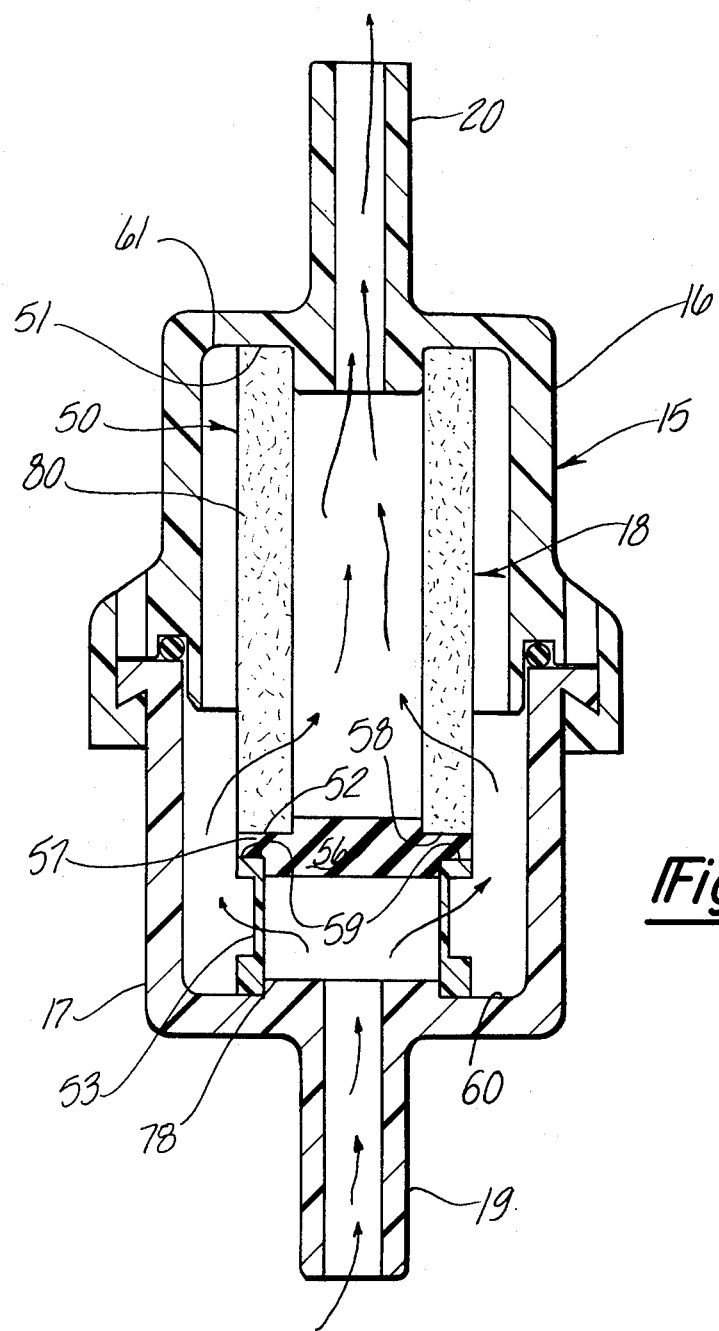
FIG. 10 is a view similar to FIG. 8, but showing an embodiment of our invention adapted for use as an odor removal filter.

Referring now to FIG. 10, an embodiment of the present invention adapted to operate as an odor removal filter is illustrated. In this embodiment of the invention, the standpipe previously described has been eliminated from the interior of the male portion 17 of the filter housing, and has been replaced by a small locating pad 78. The second portion of the assembly has also been made of much smaller length to enable greater area of filtration to occur. The upper portion 50 of the filter assembly, generally designated by the numeral 18, now consists of a charcoal filter 80 of annular cross section of substantially greater length than the embodiment previously described. As before, the upper end wall is in sealing contact with the interior end wall of the female portion of the housing 16, while the lower end wall 52 is in sealing contact with the upper wall of the plug rim 57. As before, the second portion 53 is sealingly contained between the inner end wall 60 of the portion 17 of the housing and the lower rim wall 59 of the plug 56. As shown by the arrows in FIG. 10, the air first flows in the inlet 19, is forced in a radially outward direction because of the plug 56, and then must travel through the charcoal filter 80 in a radially inward direction and out the outlet 20.

It should be understood that although not illustrated therein, many configurations of filter assemblies 18 will fit in the filter housing 15 to form many types of filters and be well within the scope of the present invention. Also, the direction of flow through the filter may be reversed depending upon the configuration of assembly 18, and be within the scope of the claims of the present invention. There also may be variations in the design and constructions of the interior sidewalls of the filter housing 15.

In any event, by abandoning traditional methods of fastening filter assemblies together, such as by threaded connectors, friction bands and the like, and providing a new and novel method of fastening such portions together, and providing novel filter assemblies to fit therein, new and improved filters, filter housings and filter assemblies are provided.

We claim:

1. A filter housing including a cup-shaped male portion having interior and exterior end and sidewalls, an axially extending inlet, and a plurality of radially and axially extending projections each having a ramp and a platform portion, a bell-shaped female portion having interior and exterior end and sidewalls, an axially extending outlet, an annular extension of said inner sidewall of said female portion, and an equal plurality of axially and radially extending receptors each having a ramp, a platform and a stop portion adapted to engage said projections upon the application of a twisting motion, and sealing means interposed between said male and said female portion adjacent the end walls thereof including an annular groove provided in the end wall of said female portion adjacent said annular extension, and an O-ring placed in said groove, wherein each of said ramp portions and said platform portions form an acute angle somewhat less than 90° with respect to said exterior sidewall to increasingly resist, in combination with said annular extension, disengagement of said male and said female portions as the pressure or vacuum inside said filter housing increases.

2. The device described in claim 1, wherein each of said radially and axially extending receptors is formed by a suitable radial extension of said exterior end wall of said female portion, a pair of axially extending sidewalls and a radially extending sidewall parallel to and spaced from said exterior sidewall of said female portion, and a platform portion complimentary in shape to the platform portion of said projection.

3. The device defined in any one of claims 1 or 2, wherein axially extending openings are provided in the rim of said bell-shaped female portion of said housing above each of said receptors to aid the escape of any entrapped air.

4. The device defined in claim 3, and including an axially extending extension of said inlet adapted to serve as a standpipe.

5. The device described in any one of claims 1 or 2, wherein said sealing means is in the form of an O-ring.

6. The device defined in claim 5, and including a protuberance immediately below said outlet.

7. The device defined in claim 3, and including a drain means operatively mounted to said male portion of said housing.

8. The device defined in claim 6, and including a locating pad formed about said inlet.

9. A filter comprising a filter housing, including a cup-shaped male portion having interior and exterior end and sidewlls, an axially extending inlet, and a plurality of radially and axially extending projections each having a ramp and a platform portion, a bell-shaped female portion having interior and exterior end and sidewalls, an axially extending outlet, an annular extension of said interior sidewall of said female portion, and an equal plurality of mating axially and radially extending receptors each having a ramp, a platform and a stop portion adapted to engage said projections upon application of a twisting motion, and sealing means interposed between said male and said female portions adjacent the end walls thereof including an annular groove adjacent to said annular extension provided in the end wall of said female portion, and an O-ring placed in said groove, all of which are adapted to provide, when assembled, a hollow chamber having an inlet and an outlet and adapted to receive a filter assembly in said hollow chamber, said filter assembly having an upper portion of a desired annular cross section and having upper and lower end walls, a lower portion of a desired annular cross section and having upper and lower end walls, and a solid elastomeric plug adapted to block the flow between said upper and lower portion of said filter assembly, with said upper projection being complimentary in shape to said desired annular cross section of said upper portion, and said lower porjection being complimentary in shape to said desired cross section of said lower portion, and having said upper portion and said lower portion operatively and sealingly mounted to said plug, with said solid elastomeric plug being adapted to block flow between said upper and said lower portions of said filter assembly and thereby create a reversal of flow direction within said filter, and also to provide sealing compression of said filter assembly in said filter housing.

* * * * *